Dec. 13, 1938.    H. F. SEIBERT    2,139,857
PROCESS OF PREPARING LACTOFLAVIN CONCENTRATES
Filed March 29, 1937
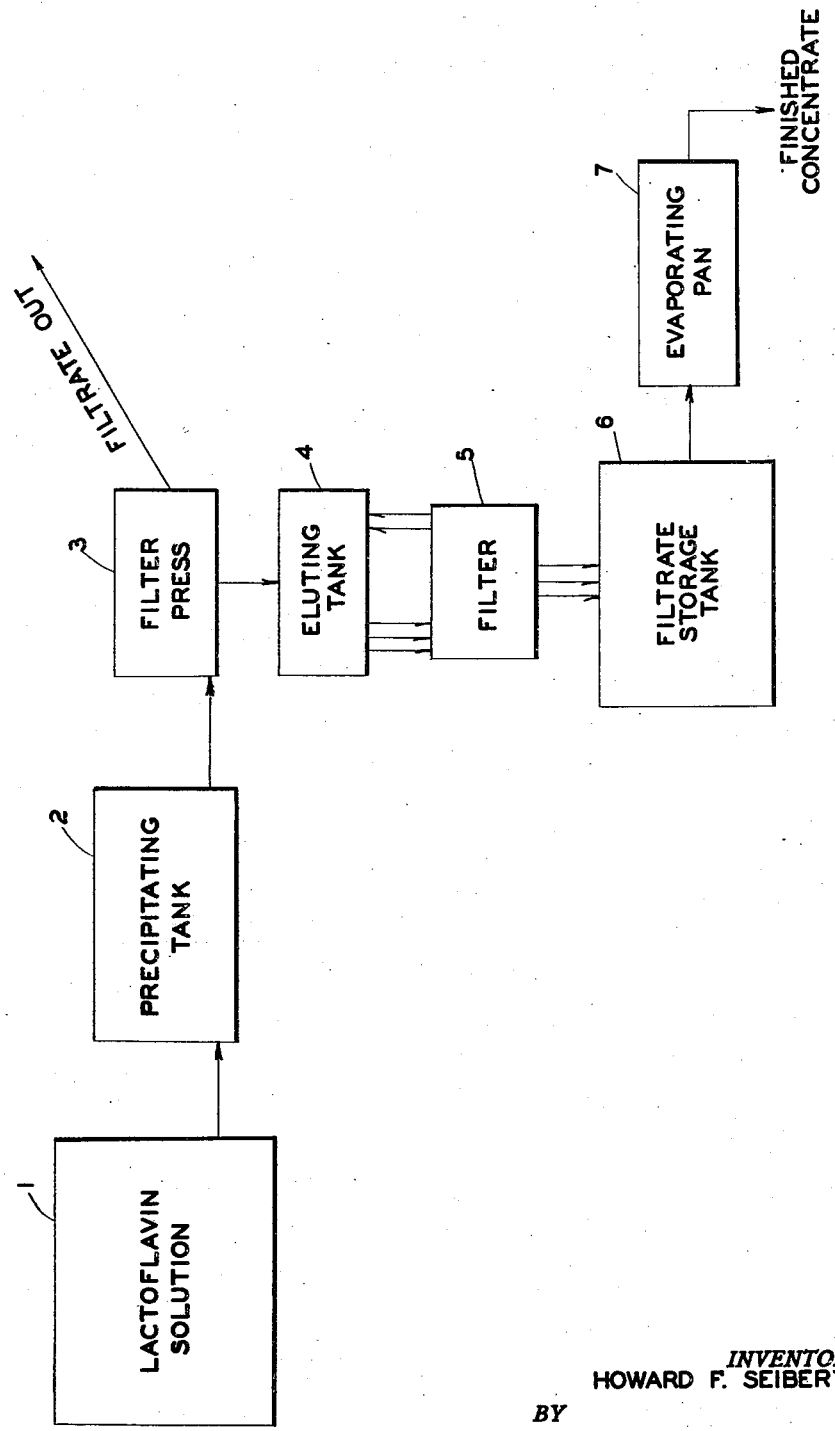
INVENTOR
HOWARD F. SEIBERT
BY
*Brockett, Hyde, Higley & Meyer*
ATTORNEYS Patented Dec. 13, 1938

2,139,857

UNITED STATES PATENT OFFICE 2,139,857

PROCESS OF PREPARING LACTOFLAVIN CONCENTRATES

Howard F. Seibert, Cleveland, Ohio, assignor, by mesne assignments, to S. M. A. Corporation, Jersey City, N. J., a corporation of New Jersey Application March 29, 1937, Serial No. 133,503

10 Claims. (Cl. 167—81)

My invention relates to an improved method of preparing lactoflavin concentrates. More particularly, it relates to an improved method by means of which lactoflavin concentrates may be produced in an economical manner without utilizing poisonous solvents.

As well known to those skilled in the art, lactoflavin is a greenish-yellow fluorescent pigment which, in aqueous solution, has a yellow to orange color possessing an active greenish fluorescence. It occurs in the whey of milk and has recently become of considerable importance in the biological art because it has been ascertained that vitamin $B_2$ is associated, to a partial extent at least, with this pigment. Vitamin $B_2$ is of considerable importance in the diet because it preserves the nerve health, improves the appetite, and aids the growth of children.

Heretofore, lactoflavin concentrates have been prepared by treating the whey of milk with fuller's earth which acts as an adsorbent. The fuller's earth was then eluted with a mixture of pyridine, methanol and water and the solution was subsequently evaporated to provide the lactoflavin concentrate. There are considerable objections to this method, however, because it is difficult to remove the last traces of pyridine and methanol, both of which are poisonous solvents. The yields obtained were also very low and consequently the cost of the concentrate has been exceedingly high.

In accordance with my invention, I have provided an improved process of preparing lactoflavin concentrates in a simple manner by means of which the concentrate may be prepared at a much lower cost than by former methods and in which the use of poisonous solvents is entirely eliminated.

It is therefore an object of my invention to provide an economical process of preparing lactoflavin concentrates by means of which comparatively high yields are obtained.

Another object of my invention is to provide an improved process of preparing lactoflavin concentrates by means of which poisonous solvents are eliminated and a lactoflavin concentrate obtained which may be utilized alone or in medicinal or food preparations.

In accordance with my invention a lead salt is first dissolved or partially dissolved and partially suspended in an aqueous solution containing lactoflavin. As the solution containing the lactoflavin I may utilize the whey of milk or dissolve whey solids in water to form an aqueous solution. Other solutions containing lactoflavin may also be employed, such as an aqueous solution of egg albumin or the aqueous extract of alfalfa meal or of animal or fish liver. I preferably utilize a metal salt which is soluble in water, such as the formates, acetates or propionates of lead although inorganic salts, such as chlorides or carbonates may be employed. In general it may be stated that any lead salt which is soluble or partially soluble in the solution containing the lactoflavin may be employed.

Hydrogen sulphide is then passed rapidly through the solution. During the formation of the precipitate, the lactoflavin is adsorbed. In order to provide the best results the amount of lead salt which is added is just sufficient or slightly in excess of the amount required to adsorb the lactoflavin, when the precipitate is formed. The amount of the lead salt to be added may be determined by taking test samples of the solution and determining by trial and error the amount of the precipitate which will adsorb the pigment. As the pigment is fluorescent in ultra-violet light, this may be readily determined by experiment. During the formation of the precipitate, fluorometric tests may be made at desired intervals to determine whether all the pigment has been adsorbed.

A filter aid, such as finely divided diatomaceous earth is then added to the solution which is filtered. The filter cake is next washed with cold water and is transferred to an eluting tank and a sufficient amount of water or ethyl alcohol, or a mixture of ethyl alcohol and water, is added to form a suspension of the cake which is heated to the boiling point and held at that temperature for approximately five minutes. Water is preferred as the eluting agent because lactoflavin is much more soluble in water than in ethyl alcohol. The suspension is then filtered, the filtrate containing the eluted lactoflavin. The filter solids or cake is subjected several times to the same treatment and the combined filtrates are concentrated, preferably in a vacuum or in an inert atmosphere to a convenient volume to form the desired concentrate. Better yields are obtained if precautions are taken to prevent decomposition resulting from oxidation or irradiation. The material however may be concentrated in the open air or under atmospheric conditions where ordinary precautions are taken to prevent oxidation. The lead sulphide, during its precipitation, is superior to fuller's earth, carbon or other adsorbents, because after precipitation, the lactoflavin may be much more readily and completely removed from the lead sulphide than from other adsorbents. I am therefore able to remove the lactoflavin by means of nonpoisonous solvents, such as water, ethyl alcohol or a mixture of such solvents.

I do not desire to be limited to the use of nonpoisonous solvents, however, because much better yields may be obtained when the lactoflavin is adsorbed by means of freshly precipitated lead sulphide than when other adsorbents are employed, irrespective of whether poisonous solvents, such as methanol or pyridine, or nonpoisonous solvents, such as water or ethyl alcohol, are employed as eluting agents because the lactoflavin may be much more readily and completely eluted from the lead sulphide than from other adsorbents, such as carbon or fuller's earth.

It will also be understood that it is not essential that the water or the mixture of water and alcohol utilized in eluting the lactoflavin should be heated to the boiling point. For instance, the lactoflavin may be eluted with water at ordinary temperatures. However, when water at such temperature is employed it requires a longer time to remove the lactoflavin. It is therefore desirable to heat the water to a temperature of at least 80° to 90° C. and preferably to the boiling point because at such temperatures the lactoflavin may be readily eluted from the lead sulphide.

In my improved process it is essential to precipitate the metal salt within a reasonable time. The rate will vary somewhat under different conditions, but for best results it should be effected as quickly a possible. If the precipitate is formed too slowly, poor yields and ineffective adsorption occurs. It is also essential that the formed precipitate should not be allowed to remain in the solution for an extended period of time because the lactoflavin has the tendency to redissolve. It is therefore desirable in my improved process that the precipitation of the metal and the filtering of the cake should be accomplished as quickly as possible.

The following specific example will serve to illustrate and explain my improved process, although it will be understood that I do not desire to be limited to the specific proportions or details recited therein. Approximately 40 gallons of an aqueous solution containing 90 pounds of milk whey solids was first filtered and placed in a tank provided with a vented cover, an agitator and a glass lined or fused surface which is not chemically reactive toward hydrogen sulphide. About 3.5 pounds of lead acetate were added and hydrogen sulphide was then rapidly passed through the solution which reacts with the lead acetate, forming a precipitate of lead sulphide. In order to expedite the reaction between the hydrogen sulphide and the lead acetate, it is desirable to introduce the hydrogen sulphide into the bottom of the solution in such a manner that the gas will be rapidly disseminated through the solution. For instance the hydrogen sulphide may be introduced into the solution through a perforated copper ring or coil at the bottom of the tank connected to a lead in pipe communicating with the hydrogen supply tank. The solution is also preferably agitated during the introduction of the hydrogen sulphide. As the lead sulphide precipitates, the lactoflavin is adsorbed, until at the end of about one to two hours practically all the lactoflavin is adsorbed. A filter aid consisting of finely divided diatomaceous earth is then added and the solution filtered.

The solid precipitate or cake, thus prepared, was washed with approximately 5 gallons of cold water and the cake was transferred to a elution tank provided with a steam jacket. Approximately 3 gallons of hot water was then added to the filter cake to form a suspension, the temperature of which was raised to the boiling point and held at that temperature for approximately five minutes, after which the mixture was filtered or centrifuged to remove the cake. The cake was again returned to the elution tank and suspended in approximately 3 gallons of water which was heated to the boiling point and held at that temperature for approximately five minutes. The suspension was again filtered or centrifuged, the cake being returned to the elution tank for another similar treatment. The combined filtrates containing the lactoflavin were then concentrated under vacuum until the concentrate was reduced to the desired volume.

The accompanying flow sheet illustrates the steps utilized in my improved process. In the drawing, the numeral 1 designates a tank containing the lactoflavin solution, the numeral 2 designates the precipitation tank, 3 a suitable filter press, 4 the elution tank, 5 a filter, 6 a storage tank, and 7 the vacuum pans.

In practicing my improved process it is highly desirable to provide means for precipitating the lead sulphide rapidly. The rate may be varied somewhat under different conditions but apparently it cannot be conducted too quickly. On the other hand, if the precipitation is conducted too slowly the adsorption is inefficient and poor yields are obtained. It is also desirable that the precipitated lead sulphide containing the adsorbed lactoflavin should be filtered promptly after precipitation, otherwise the lactoflavin begins to go back into solution and after a period of from five to six hours completely returns to solution. It is therefore essential to filter the precipitate promptly in order to obtain the best yields and for successful practice the precipitate should be filtered within a period of from one to two hours.

The particular reason why the lead sulphide adsorbs lactoflavin during its precipitation is not definitely understood. It is believed, however, that its effectiveness is due to the fact that it is in a freshly precipitated state, in other words, that the action of the lead sulphide in this state somewhat corresponds to the action of gases in the nascent state. The particular manner in which the lead sulphide is formed, however, is not an essential step in the process as it may be precipitated in various ways such as by introducing soluble lead salts and soluble sulphides in the lactoflavin solution which react to form an insoluble lead sulphide precipitate as is well known in the art.

From the foregoing description it will be apparent that I have provided an improved process of preparing lactoflavin by means of which high yields may be obtained. It will also be seen that by my improved process lactoflavin concentrates may be produced in an economical manner without introducing poisonous solvents. The concentrates may therefore be safely utilized either alone or may be introduced into foods and medicinal preparations.

What I claim is:

1. The process of preparing lactoflavin concentrates which comprises introducing a soluble lead salt in a solution containing lactoflavin, passing hydrogen sulphide through the solution to form a precipitate, filtering to provide a filter cake containing the adsorbed lactoflavin, heating a suspension of the filter cake containing the adsorbed lactoflavin in a solvent for the lactoflavin, removing the filter cake from the solution, and evaporating at least a portion of the solvent to obtain the lactoflavin concentrate.

2. The process of preparing lactoflavin concentrates which comprises introducing a soluble lead salt in a solution containing lactoflavin, passing hydrogen sulphide through the solution to precipitate lead sulphide, filtering the lead sulphide together with the adsorbed lactoflavin, treating the filter cake with a hot solvent for the lactoflavin, removing the filter cake from the solution and then evaporating at least a portion of the solvent to provide a lactoflavin concentrate.

3. The process of preparing lactoflavin concentrates which comprises dissolving a soluble lead salt in a solution containing lactoflavin, passing hydrogen sulphide through the solution to precipitate lead sulphide which adsorbs the lactoflavin, filtering the precipitate, suspending the filter cake in water, heating the water to the boiling point, removing the suspended particles, and evaporating at least a portion of the water to provide a lactoflavin concentrate.

4. The process of preparing lactoflavin concentrates which comprises dissolving a lead salt which is at least partially soluble in water in a solution containing lactoflavin, passing hydrogen sulphide through the solution to precipitate lead sulphide which adsorbs the lactoflavin, filtering the precipitate from the solution, suspending the filter cake in a nonpoisonous solvent for the lactoflavin, heating the nonpoisonous solvent to elute the lactoflavin, removing the suspended particles of lead sulphide, and then evaporating at least a portion of the solvent to provide a lactoflavin concentrate.

5. The process of preparing lactoflavin concentrates which comprises introducing a soluble lead salt in a solution containing lactoflavin, passing hydrogen sulphide through the solution to form a lead sulphide precipitate which adsorbs the lactoflavin, removing the precipitate from the solution and eluting it with a solvent for the lactoflavin, and then removing the lead sulphide from the solvent.

6. The process of preparing lactoflavin concentrates which comprises introducing a soluble lead salt in a solution containing lactoflavin, passing hydrogen sulphide through the solution to form a lead sulphide precipitate which adsorbs the lactoflavin, removing the precipitate from the solution and eluting it with a hot solvent for the lactoflavin, and then removing the lead sulphide.

7. The process of preparing lactoflavin concentrates which comprises precipitating lead sulphide in a solution containing lactoflavin which serves to adsorb the lactoflavin, separating the lead sulphide and the adsorbed lactoflavin from the solution, eluting the lead sulphide with a solvent for the lactoflavin, and then removing the lead sulphide from the solvent.

8. The process of preparing lactoflavin concentrates which comprises precipitating lead sulphide in a solution containing lactoflavin which serves to adsorb the lactoflavin in its freshly precipitated state, separating the lead sulphide and adsorbed lactoflavin from the solution, eluting the lead sulphide with a hot solvent for the lactoflavin, and then removing the lead sulphide from the solvent.

9. The process of preparing lactoflavin concentrates which comprises precipitating lead sulphide in a solution containing lactoflavin which serves to adsorb the lactoflavin, separating the lead sulphide and adsorbed lactoflavin from the solution, eluting the lead sulphide with a solvent for the lactoflavin, removing the lead sulphide from the solvent, and then evaporating at least a portion of the solvent under conditions which prevent oxidation or irradiation of the lactoflavin.

10. The process of preparing lactoflavin concentrates which comprises precipitating lead sulphide in a solution containing lactoflavin which serves to adsorb the lactoflavin, separating the lead sulphide and adsorbed lactoflavin from the solution, agitating the lead sulphide in a solvent for the lactoflavin in which the lead sulphide is insoluble, adding a filter aid, filtering the solution to remove the filter cake, and then evaporating at least a portion of the solvent to form the lactoflavin concentrate.

HOWARD F. SEIBERT.